(12) United States Patent
Uehata et al.

(10) Patent No.: US 12,391,831 B2
(45) Date of Patent: Aug. 19, 2025

(54) FLUORINE-CONTAINING POLYMER, MOLD RELEASE AGENT COMPOSITION AND MOLD RELEASE METHOD

(71) Applicant: Daikin Industries, LTD., Osaka (JP)

(72) Inventors: Hidekazu Uehata, Osaka (JP); Yasushi Nakamae, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 452 days.

(21) Appl. No.: 16/620,991

(22) PCT Filed: Jul. 24, 2018

(86) PCT No.: PCT/JP2018/027625
§ 371 (c)(1),
(2) Date: Dec. 10, 2019

(87) PCT Pub. No.: WO2019/022049
PCT Pub. Date: Jan. 31, 2019

(65) Prior Publication Data
US 2020/0199276 A1    Jun. 25, 2020

(30) Foreign Application Priority Data

Jul. 25, 2017  (JP) ................................ 2017-143714

(51) Int. Cl.
| | | |
|---|---|---|
| C08L 101/02 | (2006.01) | |
| B29C 33/58 | (2006.01) | |
| B29C 33/62 | (2006.01) | |
| C08F 220/18 | (2006.01) | |
| C08F 220/24 | (2006.01) | |
| C09D 4/00 | (2006.01) | |
| C09D 5/00 | (2006.01) | |
| C09D 7/20 | (2018.01) | |
| C09D 133/16 | (2006.01) | |

(52) U.S. Cl.
CPC ............ *C08L 101/02* (2013.01); *B29C 33/58* (2013.01); *B29C 33/62* (2013.01); *C08F 220/24* (2013.01); *C09D 4/00* (2013.01); *C09D 5/00* (2013.01); *C09D 7/20* (2018.01); *C09D 133/16* (2013.01); *C08F 220/1818* (2020.02); *C08F 2800/20* (2013.01)

(58) Field of Classification Search
CPC .......... C08L 101/02; C09D 7/20; C09D 4/00; C09D 5/00; C09D 133/16; C08F 220/24; C08F 220/1818; C08F 2800/20

USPC ......................................................... 264/334
See application file for complete search history.

(56) References Cited

U.S. PATENT DOCUMENTS

| | | | | |
|---|---|---|---|---|
| 2010/0018659 A1* | 1/2010 | Hupfield | ............. | C08F 283/122 162/164.4 |
| 2010/0183889 A1* | 7/2010 | Dams | ........................ | C08F 8/40 428/457 |
| 2019/0233564 A1 | 8/2019 | Kijima | | |

FOREIGN PATENT DOCUMENTS

| | | |
|---|---|---|
| CN | 101517018 A | 8/2009 |
| JP | S60-262870 A | 12/1985 |
| JP | H03-8245 B2 | 2/1991 |
| JP | 2009012250 A * | 1/2009 |
| JP | 2009-544867 A | 12/2009 |
| JP | 2010-530014 A | 9/2010 |
| JP | 5060847 B2 | 10/2012 |
| JP | 2014-129517 A | 7/2014 |
| WO | 2008/014239 A2 | 1/2008 |
| WO | 2008/154279 A1 | 12/2008 |

OTHER PUBLICATIONS

International Search Report dated Oct. 2, 2018 issued by the International Searching Authority in International Application No. PCT/JP2018/027625.
Extended European Search Report dated Feb. 16, 2021 from the European patent Office in EP application No. 18837345.0.
International Preliminary Report on Patentability with English Translation of Written Opinion of the International Searching Authority for PCT/JP2018/027625 dated Feb. 6, 2020.

* cited by examiner

*Primary Examiner* — Kelechi C Egwim
(74) *Attorney, Agent, or Firm* — Sughrue Mion, PLLC

(57) ABSTRACT

Provided is a mold release agent composition which has excellent mold releasability and excellent dissolution stability (storage stability). A mold release agent composition that contains: (1) a fluorine-containing polymer which has repeating units derived from (a) a fluorine-containing monomer having a perfluoroalkyl group, (b) a non-fluorine monomer having a hydrocarbon group and (c) a non-fluorine monomer having a phosphoric acid group, and wherein the amount of the phosphoric acid group-containing non-fluorine monomer (c) is 8% by weight or less relative to the fluorine-containing polymer; and (2) at least one liquid medium which is selected from among water and organic solvents.

18 Claims, No Drawings

FLUORINE-CONTAINING POLYMER, MOLD RELEASE AGENT COMPOSITION AND MOLD RELEASE METHOD

TECHNICAL FIELD

The present disclosure relates to a fluorine-containing polymer, a mold release agent composition, and a mold release method.

BACKGROUND ART

When molding a synthetic resin, rubber, or the like, it is necessary to apply a mold release agent (an external mold release agent) to the inner surface of a mold (a metal mold) in advance to increase mold releasability. Such a mold release agent is often provided as a composition (a mold release agent composition) obtained by dissolving or dispersing a mold release agent in a solvent or a dispersant in advance. Such a mold release agent composition is usually applied to the inner surface of a mold by spraying, brushing, or the like. When the solvent or the dispersant is removed after the composition is applied, a film of the mold release agent is formed on the inner surface of the mold. Accordingly the mold releasability of the mold is improved.

To date, as a mold release agent, fluorine-containing mold release agents have been used, in addition to wax-containing and silicone-containing mold release agents.

JP 5060847 B (Patent Literature 1) discloses a mold release agent comprising a copolymer compound obtained by copolymerizing a perfluoroalkyl (meth)acrylate, a phosphate group-containing (meth)acrylic acid ester, and a (meth)acryl-modified silicone oil. In a preferable embodiment (paragraph [0022]), the copolymer compound contains a phosphate group-containing (meth)acrylic acid ester in an amount of 8.5 to 9.5% by weight and, therefore, mold releasability and dissolution stability are not sufficient.

JP H03-8245 B (Patent Literature 2) discloses a mold release agent comprising a copolymer of a perfluoroalkyl-containing vinyl monomer, a phosphoric acid-containing vinyl monomer, and a hydrocarbon-containing vinyl monomer. The copolymer contains a phosphoric acid-containing vinyl monomer in an amount of 10 to 50% by weight and, therefore, mold releasability and dissolution stability are not sufficient.

JP S60-262870 A (Patent Document 3) discloses a mold release agent comprising a polymer obtained by copolymerizing a perfluoroalkyl-containing monomer and a phosphoric acid-containing monomer as essential monomers. In the Examples, the polymer contains a phosphoric acid-containing monomer in an amount of 10% by weight or more and, therefore, mold releasability and dissolution stability are not sufficient.

JP 2014-129517 A (Patent Literature 4) discloses a mold release agent comprising a fluorine-containing polymer comprising a perfluoroalkyl group-containing monomer and a hydrocarbon-containing monomer (such as stearyl acrylate). The fluorine-containing polymer does not contain a phosphate group-containing monomer so as not to allow the phosphate group to react with a molded article.

PRIOR ARTS LIST

Patent Literature

Patent Literature 1: JP 5060847 B
Patent Literature 2: JP H03-8245 B
Patent Literature 3: JP S60-262870 A
Patent Literature 4: JP 2014-129517 A

SUMMARY OF INVENTION

Technical Problem

An object of the present disclosure is to provide a mold release agent composition having excellent mold releasability and dissolution stability (storage stability).

Solution to Problem

The present disclosure provides a fluorine-containing polymer having repeating units derived from:
(a) a fluorine-containing monomer having a perfluoroalkyl group,
(b) a non-fluorine monomer having a hydrocarbon group, and
(c) a non-fluorine monomer having a phosphate group, wherein an amount of the phosphate group-containing non-fluorine monomer (c) is 8% by weight or less, based on the fluorine-containing polymer.

Moreover, the present disclosure provides a mold release agent composition comprising:
(1) a fluorine-containing polymer having repeating units derived from:
   (a) a fluorine-containing monomer having a perfluoroalkyl group,
   (b) a non-fluorine monomer having a hydrocarbon group, and
   (c) a non-fluorine monomer having a phosphate group,
   wherein an amount of the phosphate group-containing non-fluorine monomer (c) is 8% by weight or less, based on the fluorine-containing polymer; and
(2) at least one liquid medium selected from water and organic solvents.

Moreover, the present disclosure provides a mold release agent composition comprising:
(1) a fluorine-containing polymer having repeating units derived from:
   (a) a fluorine-containing monomer having a perfluoroalkyl group,
   (b) a non-fluorine monomer having a hydrocarbon group, and
   (c) a non-fluorine monomer having a phosphate group; and
(2) at least one liquid medium selected from water and organic solvents,
wherein an amount of free phosphoric acid present in the mold release agent composition is 1 part by weight or less, based on 100 parts by weight of the fluorine-containing polymer.

Moreover, the present disclosure provides a method for producing a fluorine-containing polymer, the method comprising copolymerizing:
(a) a fluorine-containing monomer having a perfluoroalkyl group,
(b) a non-fluorine monomer having a hydrocarbon group, and
(c) a non-fluorine monomer having a phosphate group.

In addition, the present disclosure provides a method for forming a mold release agent film, the method comprising:
(i) applying a mold release agent composition to an inner surface of a mold to form a film of the mold release agent composition.

Furthermore, the present disclosure provides a method for producing a molded article, comprising:
(i) applying a mold release agent composition to an inner surface of a mold to form a film of the mold release agent composition,
(ii) filling the mold having the film of the mold release agent composition with a molding composition to obtain a molded article, and
(iii) removing the molded article from the mold.

Advantageous Effects of Invention

The mold release agent composition according to the present disclosure has excellent mold releasability and excellent storage stability. The mold release agent composition has increased adhesion to (reactivity with) the metal of a metal mold, thus has extended mold releasability, and enables multiple times of mold release.

The fluorine-containing polymer according to the present disclosure has excellent solubility (dissolution stability) in a liquid medium (an organic solvent in particular).

DESCRIPTION OF EMBODIMENT

[Components of Mold Release Agent Composition]
The mold release agent composition comprises:
(1) a fluorine-containing polymer, and
(2) a liquid medium that is water and/or an organic solvent.

In the mold release agent composition, the fluorine-containing polymer functions as a mold release agent. The mold release agent composition is preferably a solution or an aqueous emulsion.

(1) Fluorine-Containing Polymer
The fluorine-containing polymer is an active component in the mold release agent composition, or that is to say, the fluorine-containing polymer is the mold release agent.

The fluorine-containing polymer preferably has:
(a) a repeating unit derived from a fluorine-containing monomer having a perfluoroalkyl group having 1 to 20 carbon atoms,
(b) a repeating unit derived from a non-fluorine monomer having a hydrocarbon group having 1 to 40 carbon atoms, and
(c) a repeating unit derived from a non-fluorine monomer having a phosphate group. The fluorine-containing polymer may have another repeating unit (d) (another monomer (d)) in addition to the repeating units (a), (b), and (c).

(a) Fluorine-Containing Monomer
The fluorine-containing monomer (a) is preferably a compound represented by the formula:

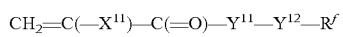

wherein
$X^{11}$ is a hydrogen atom, an alkyl group having 1 to 10 carbon atoms, or a halogen atom,
$Y^{11}$ is —O— or —NH—,
$Y^{12}$ is a direct bond, a divalent aliphatic hydrocarbon group, a divalent aromatic hydrocarbon group, or a divalent cycloaliphatic hydrocarbon group, and
$R^f$ is a perfluoroalkyl group having 1 to 20 carbon atoms.
$X^{11}$ is a hydrogen atom, an alkyl group having 1 to 10 carbon atoms, or a halogen atom (such as a fluorine atom, a chlorine atom, a bromine atom, or an iodine atom). $X^{11}$ is preferably a hydrogen atom, a methyl group, or a chlorine atom.
$Y^{11}$ is —O— or —NH—. $Y^{11}$ is preferably —O—. That is to say, the fluorine-containing monomer (a) is preferably an acrylate ester.
$Y^{12}$ is a direct bond, a divalent aliphatic hydrocarbon group, a divalent aromatic hydrocarbon group, or a divalent cycloaliphatic hydrocarbon group. $Y^{12}$ is preferably a linear or branched aliphatic hydrocarbon group having 1 to 40 carbon atoms, an aromatic hydrocarbon group having 6 to 12 carbon atoms, or a cycloaliphatic hydrocarbon group having 6 to 12 carbon atoms. $Y^{12}$ is more preferably a linear or branched divalent aliphatic hydrocarbon group having 1 to 10 carbon atoms, a divalent aromatic hydrocarbon group having 6 to 10 carbon atoms, or a divalent cycloaliphatic hydrocarbon group having 6 to 10 carbon atoms. $Y^{12}$ is particularly preferably a linear or branched alkylene group having 1 to 10 carbon atoms.

The number of carbon atoms of the $R^f$ group is preferably 1 to 12, for example, 1 to 6, in particular 4 to 6, and especially 6. Examples of the $R^f$ group include —$CF_3$, —$CF_2CF_3$, —$CF_2CF_2CF_3$, —$CF(CF_3)_2$, —$CF_2CF_2CF_2CF_3$, —$CF_2CF(CF_3)_2$, —$C(CF_3)_3$, —$(CF_2)_4CF_3$, —$(CF_2)_2CF(CF_3)_2$, —$CF_2C(CF_3)_3$, —$CF(CF_3)CF_2CF_2CF_3$, —$(CF_2)_5CF_3$, —$(CF_2)_3CF(CF_3)_2$, —$(CF_2)_4CF(CF_3)_2$, and —$C_8F_{17}$.

Specific examples of the fluorine-containing monomer include, but are not limited to, those set forth below.

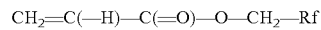

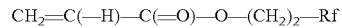

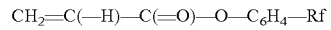

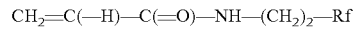

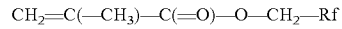

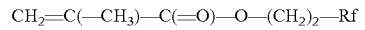

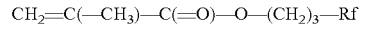

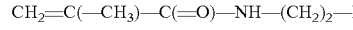

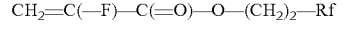

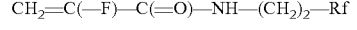

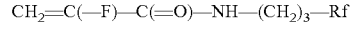

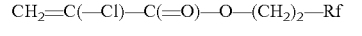

wherein Rf is a perfluoroalkyl group having 1 to 20 carbon atoms.

(b) Hydrocarbon Group-Containing Fluorine-Free Monomer
The hydrocarbon group-containing fluorine-free monomer (b) is preferably a compound represented by formula:

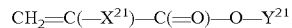

wherein $X^{21}$ is a hydrogen atom or a methyl group, and $Y^{21}$ is a hydrocarbon group having 1 to 40 carbon atoms.

$X^{21}$ is a hydrogen atom or a methyl group. $X^{21}$ is preferably a hydrogen atom because mold releasability is increased. That is to say, an acrylic acid ester is preferable.

$Y^{21}$ is preferably a linear or branched monovalent aliphatic hydrocarbon group having 1 to 40 carbon atoms, a monovalent aromatic hydrocarbon group having 6 to 12 carbon atoms, or a monovalent cycloaliphatic hydrocarbon group having 6 to 12 carbon atoms.

An example of the linear or branched monovalent aliphatic hydrocarbon group having 1 to 40 carbon atoms is an alkyl group. The number of carbon atoms of the aliphatic hydrocarbon group is preferably 5 to 35, for example, 10 to 30, in particular 14 to 28, and especially 16 to 26.

Examples of the monovalent aromatic hydrocarbon group having 6 to 12 carbon atoms include a phenyl group, a 2-ethylphenyl group, an indenyl group, a toluyl group, and a benzyl group.

Examples of the monovalent cycloaliphatic hydrocarbon group having 6 to 12 carbon atoms include a cyclohexyl group, a norbornyl group, a norbornylmethyl group, an isobornyl group, a bornyl group, a menthyl group, an octahydroindenyl group, an adamantyl group, and a dimethyladamantyl group.

Specific examples of the hydrocarbon group-containing fluorine-free monomer include cyclohexyl (meth)acrylate, n-heptyl (meth)acrylate, n-octyl (meth)acrylate, 2-ethylhexyl (meth)acrylate, nonyl (meth)acrylate, decyl (meth)acrylate, lauryl (meth)acrylate, tridecyl (meth)acrylate, tetradecyl (meth)acrylate, cetyl (meth)acrylate, stearyl (meth)acrylate, behenyl (meth)acrylate, norbornyl (meth)acrylate, norbornylmethyl (meth)acrylate, isobornyl (meth)acrylate, bornyl (meth)acrylate, menthyl (meth)acrylate, octahydroindenyl (meth)acrylate, adamantyl (meth)acrylate, dimethyladamantyl (meth)acrylate, phenyl (meth)acrylate, 2-ethylphenyl (meth)acrylate, indenyl (meth)acrylate, toluyl (meth)acrylate, and benzyl (meth)acrylate. Lauryl (meth)acrylate, stearyl acrylate, and isobornyl (meth)acrylate are preferable. Stearyl acrylate is particularly preferable.

(c) Phosphate Group-Containing Fluorine-Free Monomer

The phosphate group-containing fluorine-free monomer (c) is preferably an acrylate monomer. The phosphate group-containing fluorine-free monomer (c) is preferably a compound represented by formula:

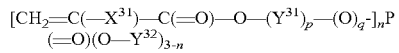

wherein
$X^{31}$ is a hydrogen atom or a methyl group,
$Y^{31}$ is an alkylene group or an oxyalkylene group having 1 to 5 carbon atoms,
$Y^{32}$ is a hydrogen atom, an alkali metal atom, or an ammonium group,
p is a number of 1 to 10,
q is 0 or 1, and
n is 1, 2, or 3.

$X^{31}$ is a hydrogen atom or a methyl group. $X^{31}$ is preferably a methyl group because mold releasability is increased.

$Y^{31}$ is an alkylene group having 1 to 5 carbon atoms or an oxyalkylene group having 1 to 5 carbon atoms. $Y^{31}$ is preferably an alkylene group.

$Y^{32}$ is a hydrogen atom, an alkali metal atom, or an ammonium group. $Y^{32}$ is preferably a hydrogen atom because mold releasability is increased. Examples of the alkali metal atom include lithium, sodium, and potassium. The ammonium group (or the amino group) may be substituted with a substituent, and examples of the substituent include alkyl groups having 1 to 4 carbon atoms and hydroxyalkyl groups having 1 to 4 carbon atoms.

p is a number of 1 to 10. p is preferably 1 to 6.

q is 0 or 1. When $Y^{31}$ is an alkylene group, q is 0 or 1. When $Y^{31}$ is an alkylene group, q is preferably 1. When $Y^{31}$ is an oxyalkylene group, q is 0.

n is 1, 2, or 3. n is preferably 1 or 2. That is to say, the phosphate group-containing fluorine-free monomer is preferably a phosphoric acid monoester or a phosphoric acid diester. Preferably, the phosphate group-containing fluorine-free monomer is solely a phosphoric acid monoester or is a mixture of a phosphoric acid monoester and a phosphoric acid diester. In the mixture of a phosphoric acid monoester and a phosphoric acid diester, the weight ratio of the phosphoric acid monoester to the phosphoric acid diester may be 95:5 to 50:50, preferably 90:10 to 60:40, and more preferably 85:15 to 65:35.

The phosphate group-containing fluorine-free monomer can be produced by reacting source material compounds such as phosphoric acid and (meth)acryl chloride. After the phosphate group-containing fluorine-free monomer is produced, source material phosphoric acid (free phosphoric acid) may remain unreacted. Free phosphoric acid may adversely affect mold releasability, dissolution stability, and storage stability. The amount of free phosphoric acid is preferably 1 part by weight or less, for example, 0.5 parts by weight or less, and particularly 0.2 parts by weight or less, based on 100 parts by weight of the fluorine-containing polymer. A lower limit of the amount of free phosphoric acid may be, for example, 0.01 parts by weight, based on 100 parts by weight of the fluorine-containing polymer.

Specific examples of the phosphate group-containing non-fluoride monomer are as follows:

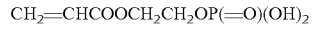

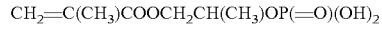

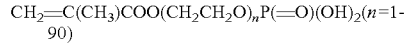

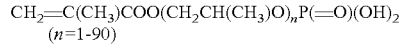

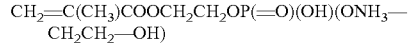

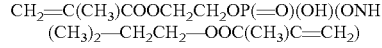

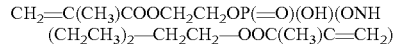

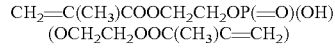

(d) Another Monomer

The fluorine-containing polymer may have a repeating unit derived from another monomer. The fluorine-containing polymer preferably does not have a repeating unit derived from the other monomer. That is to say, the fluorine-containing polymer preferably consists of repeating units derived from the monomers (a), (b), and (c). Examples of the other monomer include silicon-containing monomers such as a modified silicone oil, for example, an amino-modified silicone oil and an acryl-modified silicone oil; and di(meth) acrylate monomers. Other examples of the other monomer include ethylene, vinyl acetate, acrylonitrile, styrene, polyethylene glycol (meth)acrylate, polypropylene glycol (meth) acrylate, methoxy polyethylene glycol (meth)acrylate, methoxy polypropylene glycol (meth)acrylate, and vinyl alkyl ether.

Each of the monomers (a) to (d) may be used alone or in a mixture of two or more.

The amount of the phosphate group-containing fluorine-free monomer (c) is generally 0.1 to 8% by weight, based on the fluorine-containing polymer. The amount of the phosphate group-containing fluorine-free monomer (c) may be preferably 0.2 to 5% by weight and in particular 0.5 to 4% by weight. A lower limit of the amount of the phosphate group-containing fluorine-free monomer (c) may be 0.1% by weight, for example, 0.2% by weight, in particular 0.5% by weight, and especially 0.8% by weight. An upper limit of the amount of the phosphate group-containing fluorine-free monomer (c) may be 5% by weight, for example, 4% by weight, and in particular 3% by weight.

The amount of the fluorine-containing monomer (a) may be 20 to 95% by weight, for example, 30 to 90% by weight, in particular 35 to 80% by weight, and especially 40 to 75% by weight, based on the fluorine-containing polymer.

In the fluorine-containing polymer, the amount of the hydrocarbon group-containing fluorine-free monomer (b) may be 0.1 to 200 parts by weight, for example, 1 to 100 parts by weight, and in particular 3 to 50 parts by weight, and the amount of the other monomer (d) may be 0 to 50 parts by weight (or 0 to 10 parts by weight), 0.1 to 30 parts by weight, and especially 0.5 to 20 parts by weight, based on 100 parts by weight of the fluorine-containing monomer (a).

The amount of the monomer (b) is preferably 5 to 75% by weight, 5 to 50% by weight, for example, 10 to 40% by weight, and in particular 15 to 35% by weight, based on a total of the monomer (a) and the monomer (b).

Alternatively, the amount of the monomer (b) is preferably 4 to 95% by weight, for example, 10 to 75% by weight, and in particular 15 to 50% by weight, based on the fluorine-containing polymer.

The number-average molecular weight (Mn) of the fluorine-containing polymer is generally 1,000 to 1,000,000, for example, 2,000 to 500,000, and in particular 3,000 to 200,000. The number-average molecular weight (Mn) of the fluorine-containing polymer is generally measured by gel permeation chromatography (GPC).

(2) Liquid Medium

The liquid medium is at least one selected from water and organic solvents. The liquid medium may be solely an organic solvent. Alternatively, the liquid medium may be an aqueous medium. That is to say, the aqueous medium may be solely water or may be a mixture of water and a (water-miscible) organic solvent. The amount of the water-miscible organic solvent may be 30% by weight or less, for example, 10% by weight or less (preferably 0.1% or more), based on the liquid medium.

The amount of the liquid medium may be 30 to 99.1% by weight and in particular 50 to 99% by weight, based on the mold release agent composition.

(3) Other Components

The mold release agent composition may contain other components.

When the mold release agent composition is an aqueous emulsion, the mold release agent composition preferably contains an emulsifier. The emulsifier may be at least one selected from nonionic emulsifiers, cationic emulsifiers, anionic emulsifiers, and amphoteric emulsifiers.

The mold release agent composition may contain an additive as the other component.

Examples of the additive include silicon-containing compounds, waxes, and acrylic emulsions. Other examples of the additive include other fluorine-containing polymers, drying rate modifiers, cross-linking agents, film-forming aids, compatibilizers, surfactants, antifreezing agents, viscosity modifiers, UV absorbers, antioxidants, pH adjusters, antifoaming agents, texture modifiers, slippage modifiers, antistatic agents, hydrophilizing agents, antibacterial agents, preservatives, insecticides, fragrances, and flame retardants.

The amount of the other components may be 0.1 to 20% by weight, for example, 0.5 to 10% by weight, based on the mold release agent composition.

[Production of Mold Release Agent Composition (Production of Fluorine-Containing Polymer)]

The fluorine-containing polymer can be produced by a method comprising copolymerizing monomers.

The copolymerization may be emulsion polymerization or solution polymerization.

Emulsion polymerization can be performed, for example, as follows. In the presence of a polymerization initiator and an emulsifier, various monomers are emulsified in water, and after nitrogen purge, the emulsion is stirred at a temperature in the range of 50 to 80° C. for 1 to 10 hours to perform the copolymerization.

In the emulsion polymerization, examples of the polymerization initiator include water-soluble polymerization initiators such as benzoyl peroxide, lauroyl peroxide, t-butyl perbenzoate, 1-hydroxycyclohexyl hydroperoxide, 3-carboxypropionyl peroxide, acetyl peroxide, azobisisobutylamidine dihydrochloride, azobisisobutyronitrile, sodium peroxide, potassium persulfate, and ammonium persulfate; and oil-soluble polymerization initiators such as azobisisobutyronitrile, benzoyl peroxide, di-t-butyl peroxide, lauryl peroxide, cumene hydroperoxide, t-butyl peroxypivalate, diisopropyl peroxydicarbonate, and azobismethylpropionate.

In the emulsion polymerization, the polymerization initiator is usually used in an amount in the range of 0.01 to 10 parts by weight, based on 100 parts by weight of the monomers.

In the emulsion polymerization, in order to obtain a copolymer water dispersion that has excellent stability even when left to stand, the monomers are preferably formed into fine particles in water by using an emulsifying apparatus capable of imparting strong crushing energy, such as a high-pressure homogenizer or an ultrasonic homogenizer, and polymerized by using an oil-soluble polymerization initiator.

In the emulsion polymerization, various anionic, cationic, or nonionic emulsifiers are usable as the emulsifier. The emulsifier is usually used in an amount in the range of 0.5 to 20 parts by weight, based on 100 parts by weight of the monomers.

Examples of the nonionic emulsifier include polyoxyethylene alkyl ethers, sorbitan alkylates, and sorbitan alkyl esters. Examples of polyoxyethylene alkyl ethers include polyoxyethylene lauryl ether.

Examples of the anionic emulsifier include alkyl sulfate salts, alkyl sulfonate salts, and alkyl phosphate esters. Examples of alkyl sulfate esters include sodium alkyl sulfates.

Examples of the cationic emulsifier include quaternary ammonium salts and alkylamine salts. Examples of the quaternary ammonium salts include lauryltrimethyl ammonium chloride.

In the emulsion polymerization, when the monomers are not completely compatible, it is preferable to add a compatibilizer that makes the monomers sufficiently compatible, such as a water-soluble organic solvent or a low molecular weight monomer. The addition of the compatibilizer can improve emulsification properties and copolymerization properties.

Examples of the water-soluble organic solvent as the compatibilizer include acetone, methyl ethyl ketone, ethyl acetate, propylene glycol, dipropylene glycol monomethyl ether, dipropylene glycol, diethylene glycol diethyl ether, tripropylene glycol, and ethanol. The water-soluble organic solvent is usually used in an amount in the range of 1 to 50 parts by weight, based on 100 parts by weight of water. Preferably, the water-soluble organic solvent is used in an amount in the range of 10 to 40 parts by weight, based on 100 parts by weight of water.

In the emulsion polymerization, a chain transfer agent may be used to regulate the molecular weight of the resulting polymer. Examples of the chain transfer agent include lauryl mercaptan, glycidyl mercaptan, mercaptoacetic acid, 2-mercaptoethanol, 2-ethylhexyl thioglycolate, and 2,3-dimethylcapto-1-propanol. One or at least two chain transfer agents may be used as necessary. The chain transfer agent is usually used in an amount in the range of 0.001 to 7.0 parts by weight, based on 100 parts by weight of the monomers.

The solution polymerization can be performed, for example, as follows. In the presence of a polymerization initiator, the monomers are dissolved in an organic solvent, and after nitrogen purge, and the solution is heated and stirred at a temperature in the range of 30 to 120° C. for 1 to 10 hours. Examples of the polymerization initiator include azobisisobutyronitrile, benzoyl peroxide, di-t-butyl peroxide, lauryl peroxide, cumene hydroperoxide, t-butyl peroxypivalate, and diisopropyl peroxydicarbonate. The polymerization initiator is usually used in an amount in the range of 0.01 to 20 parts by weight, based on 100 parts by weight of the monomers. Preferably, the polymerization initiator is used in an amount in the range of 0.02 to 10 parts by weight, based on 100 parts by weight of the monomers.

In solution polymerization, the organic solvent is not limited as long as the organic solvent is inert to and dissolves the monomers. Examples of the organic solvent include acetone, chloroform, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, ethyl acetate, and butyl acetate. The organic solvent is usually used in an amount in the range of 20 to 2000 parts by weight, based on 100 parts by weight of total of the monomers. Preferably, the organic solvent is used in an amount in the range of 50 to 1000 parts by weight, based on 100 parts by weight of total of the monomers.

[Form and Application of Mold Release Agent Composition]

The form of the mold release agent composition can be suitably selected according to the intended use or the like and is, for example, a solution, an emulsion, or an aerosol. The mold release agent composition is preferably a solution or an aerosol containing an organic solvent, or an aqueous emulsion containing water.

The mold release agent composition preferably contains the fluorine-containing polymer in an amount of 0.5% by weight to 50% by weight, more preferably 1.0% by weight to 30% by weight, and particularly preferably 1.5% by weight to 20% by weight, based on the mold release agent composition.

In order to improve mold wettability, the mold release agent composition may further contain a surfactant (an emulsifier). The surfactant may be a fluorine-containing or fluorine-free surfactant. The fluorine-containing or fluorine-free surfactant may be an anionic surfactant, a nonionic surfactant, or a cationic surfactant.

Examples of the fluorine-containing surfactant include fluorine-containing polyoxyethylene, sulfonic acid salts, carboxylic acid salts, and quaternary ammonium salts.

Examples of the fluorine-free anionic surfactant include alkyl sulfate salts, alkyl sulfonate salts, and alkyl phosphate esters. Examples of alkyl sulfate esters include sodium alkyl sulfates.

Examples of the fluorine-free nonionic surfactant include polyoxyethylene alkyl ethers, sorbitan alkylates, and sorbitan alkyl esters. Examples of polyoxyethylene alkyl ethers include polyoxyethylene lauryl ether.

Examples of the fluorine-free cationic surfactant include quaternary ammonium salts and alkylamine salts.

Examples of the quaternary ammonium salts include lauryltrimethyl ammonium chloride.

When the surfactant is contained, the amount of the surfactant may be 0.01% by weight to 20% by weight, preferably 0.01% by weight to 15% by weight, and more preferably 0.05% by weight to 10% by weight, based on the mold release agent composition.

In order to improve mold releasability and/or finishability, the mold release agent composition may further contain at least one mold release improving additive selected from the group consisting of silicone compounds, wax-based compounds, and fluorine-containing compounds.

Examples of the silicone compounds include dimethyl silicone oil, methylphenyl silicone oil, modified silicone oil (such as amino-modified silicone oil), fluorosilicone oil, and silicone resin. Examples of wax-based compounds include polyethylene wax, paraffin wax, and carnauba wax. Examples of fluorine-containing compounds include polytetrafluoroethylene, fluoropolyether, and fluorochloropolyether.

The amount of the mold release improving additive may be 0.01% by weight to 20% by weight and preferably 0.02% by weight to 15% by weight, based on the mold release agent composition.

When the mold release agent composition is an aqueous emulsion, the mold release agent composition preferably contains at least one emulsifier selected from the group consisting of nonionic emulsifiers, anionic emulsifiers, and cationic emulsifiers.

Any nonionic emulsifier may be used as long as it can emulsify and disperse the fluorine-containing polymer of the present disclosure in an aqueous emulsion, and examples include polyoxyethylene alkyl ethers, sorbitan alkylates, and sorbitan alkyl esters. Examples of the polyoxyethylene alkyl ethers include polyoxyethylene lauryl ether.

Examples of the anionic emulsifiers include alkyl sulfate salts, alkyl sulfonate salts, and alkyl phosphate esters. Examples of alkyl sulfate esters include sodium alkyl sulfates.

Examples of cationic emulsifiers include quaternary ammonium salts and alkylamine salts. Examples of quaternary ammonium salts include lauryltrimethyl ammonium chloride.

The amount of the emulsifier is usually 0.5 parts by weight to 25 parts by weight, preferably 1.0 parts by weight to 20 parts by weight, and more preferably 2.0 parts by weight to 15 parts by weight, based on 100 parts by weight of the fluorine-containing polymer.

When the mold release agent composition is a solution, the mold release agent composition may further contain, for example, an organic solvent.

When the mold release agent composition is an aerosol, an aerosol container can be filled with the mold release agent composition together with a propellant. Examples of the propellant include LPG, dimethyl ether, and carbon dioxide. The amount of the propellant is usually 10 to 95% by weight, preferably 20 to 90% by weight, and more preferably 30 to 90% by weight, based on the total amount of the mold release agent composition and the propellant. When the amount of the propellant is 10% by weight or more, there is the tendency that the mold release agent composition can be sprayed in a more favorable manner, and a more uniform film is obtained. When the amount of the propellant is 95% by weight or less, there is the tendency that the film does not become excessively thin, and mold releasability is not excessively impaired.

The mold release agent composition can be used as an internal mold release agent or an external mold release agent. The mold release agent composition is preferably used as an external mold release agent.

The mold release agent composition is usually used as follows: The mold release agent composition is applied to the inner surface of a mold and dried to remove the solvent and the dispersant, thus a mold release agent film (a film of the fluorine-containing polymer) is formed on the mold. Then the mold is filled with a molding composition to produce a molded material, and the molded material is removed from the mold.

Examples of the mold utilizing the mold release agent composition include molds made of metal such as aluminum, SUS, and iron, molds made of epoxy resin and wood, and nickel-electroformed or chrome-plated molds.

Examples of the molding material to be released from the mold by utilizing the mold release agent composition include rubbers such as a urethane rubber, H-NBR, NBR, a silicone rubber, EPDM, CR, NR, a fluororubber, SBR, BR, IIR, and IR, thermosetting resins such as a urethane foam, an epoxy resin, a phenol resin, and FRP (such as CFRP and GFRP), and thermoplastic resins such as ABS, a polycarbonate, and PBT.

EXAMPLES

The present disclosure will now be described in more detail by way of Examples below, but the present disclosure is not limited only to the Examples.

The test methods are as follows.

<Release Persistence>

A mold release agent compositions was diluted to 0.3% by mass with isooctane and applied under the same conditions with a spray gun to a hole in a cylindrical intermediate mold of a metal mold (3-plate type) maintained at 180° C., and the mold was filled with a sulfur-vulcanized EPDM compound (catalyst:metallocene). Then, the EPDM compound was pressed at 180° C. for 10 minutes. After pressing, the resistance of a cylindrical molded product in the intermediate mold was measured with a pressure gauge (0 to 200 N). Then, molding was performed without applying a mold release agent composition, and the measurement of resistance was repeated. A greater resistance requires a greater force for mold release, and a smaller resistance requires a smaller force for mold release. That is to say, a smaller resistance indicates better mold releasability, and a greater resistance indicates a poorer mold releasability.

The number of times of mold release during the resistance was maintained at 20 N or less was regarded as the number of times the mold releasability persisted, and thus regarded as release persistence.

<Dissolution Stability (Storage Stability)>

A mold release agent compositions was left to stand in a steam dryer at 60° C., and the state of dissolution of the mold release agent composition was observed over time. The number of days was counted until the dissolved mold release agent compositions left to stand according to the above test method exhibited dissolution failure such as gelation or separation into two layers, and dissolution stability was evaluated according to the number of days until the dissolution failure occurred. That is to say, a greater number of days until dissolution failure occurs indicates better dissolution stability, and a smaller number of days until dissolution failure occurs indicates poorer dissolution stability.

Example 1

Monomers consisting of 21 g of perfluoroalkyl methacrylate: $C_6F_{13}$—$CH_2CH_2OCOC(CH_3)$=$CH_2$, 8.7 g of stearyl acrylate, and 0.3 g of phosphate group-containing (meth) acrylic acid: $CH_2$=$C(CH_3)COOCH_2CH_2OPO(OH)_2$, and 0.4 g of an initiator, t-butyl peroxypivalate, were dissolved in 80 g of butyl acetate and then polymerized at 65° C. for 8 hours to give a polymer solution (a mold release agent composition). A monomeric composition of the polymer was almost the same as a composition of the charged monomers. The charged monomers are shown in Table 1.

The release persistence and the dissolution stability of the mold release agent composition were tested. The test results are shown in Table 3.

Example 2

A polymer solution (a mold release agent composition) was obtained in the same manner as in Example 1 except that 21 g of perfluoroalkyl methacrylate: $C_6F_{13}$—$CH_2CH_2OCOC(CH_3)$=$CH_2$, 8.4 g of stearyl acrylate, and 0.6 g of phosphate group-containing (meth)acrylic acid: $CH_2$=$C(CH_3)COOCH_2CH_2OPO(OH)_2$ were used as monomers. A monomeric composition of the polymer was almost the same as a composition of the charged monomers. The charged monomers are shown in Table 1.

The release persistence and the dissolution stability of the mold release agent composition were tested. The test results are shown in Table 3.

Example 3

A polymer solution (a mold release agent composition) was obtained in the same manner as in Example 1 except that 27 g of perfluoroalkyl methacrylate: $C_6F_{13}$—$CH_2CH_2OCOC(CH_3)$=$CH_2$, 2.4 g of stearyl acrylate, and 0.6 g of phosphate group-containing (meth)acrylic acid: $CH_2$=$C(CH_3)COOCH_2CH_2OPO(OH)_2$ were used as monomers. A monomeric composition of the polymer was almost the same as a composition of the charged monomers. The charged monomers are shown in Table 1.

The release persistence and the dissolution stability of the mold release agent composition were tested. The test results are shown in Table 3.

Example 4

A polymer solution (a mold release agent composition) was obtained in the same manner as in Example 1 except that 21 g of perfluoroalkyl methacrylate: $C_6F_{13}$—$CH_2CH_2OCOC(CH_3)$=$CH_2$, 8.4 g of lauryl acrylate, and 0.6 g of phosphate group-containing (meth)acrylic acid: $CH_2$=$C(CH_3)COOCH_2CH_2OPO(OH)_2$ were used as monomers. A monomeric composition of the polymer was almost the same as a composition of the charged monomers. The charged monomers are shown in Table 1.

The release persistence and the dissolution stability of the mold release agent composition were tested. The test results are shown in Table 3.

Example 5

A polymer solution (a mold release agent composition) was obtained in the same manner as in Example 1 except that 21 g of perfluoroalkyl methacrylate: $C_6F_{13}$—$CH_2CH_2OCOC(CH_3)$=$CH_2$, 7.8 g of stearyl acrylate, and 1.2 g of phosphate group-containing (meth)acrylic acid: $CH_2$=$C(CH_3)COOCH_2CH_2OPO(OH)_2$ were used as monomers. A monomeric composition of the polymer was almost the same as a composition of the charged monomers. The charged monomers are shown in Table 1.

The release persistence and the dissolution stability of the mold release agent composition were tested. The test results are shown in Table 3.

Example 6

A polymer solution (a mold release agent composition) was obtained in the same manner as in Example 1 except that 21 g of perfluoroalkyl methacrylate: $C_6F_{13}$—$CH_2CH_2OCOC(CH_3)$=$CH_2$, 7.8 g of lauryl acrylate, and 1.2 g of phosphate group-containing (meth)acrylic acid: $CH_2$=$C(CH_3)COOCH_2CH_2OPO(OH)_2$ were used as monomers. A monomeric composition of the polymer was almost the same as a composition of the charged monomers. The charged monomers are shown in Table 1.

The release persistence and the dissolution stability of the mold release agent composition were tested. The test results are shown in Table 3.

Example 7

A polymer solution (a mold release agent composition) was obtained in the same manner as in Example 1 except that 21 g of perfluoroalkyl methacrylate: $C_6F_{13}$—$CH_2CH_2OCOC(CH_3)$=$CH_2$, 8.7 g of stearyl acrylate, and 0.3 g of phosphate group-containing (meth)acrylic acid: $CH_2$=$C(CH_3)COO(C_2H_4O)_{4-5}PO(OH)_2$ were used as monomers. A monomeric composition of the polymer was almost the same as a composition of the charged monomers. The charged monomers are shown in Table 1.

The release persistence and the dissolution stability of the mold release agent composition were tested. The test results are shown in Table 3.

Example 8

A polymer solution (a mold release agent composition) was obtained in the same manner as in Example 1 except that 21 g of perfluoroalkyl methacrylate: $C_6F_{13}$—$CH_2CH_2OCOC(CH_3)$=$CH_2$, 8.4 g of stearyl acrylate, and 0.6 g of phosphate group-containing (meth)acrylic acid: $CH_2$=$C(CH_3)COO(C_2H_4O)_{4-5}PO(OH)_2$ were used as monomers. A monomeric composition of the polymer was almost the same as a composition of the charged monomers. The charged monomers are shown in Table 1.

The release persistence and the dissolution stability of the mold release agent composition were tested. The test results are shown in Table 3.

Example 9

A polymer solution (a mold release agent composition) was obtained in the same manner as in Example 1 except that 21 g of perfluoroalkyl methacrylate: $C_6F_{13}$—$CH_2CH_2OCOC(CH_3)$=$CH_2$, 7.8 g of stearyl acrylate, and 1.2 g of phosphate group-containing (meth)acrylic acid: $CH_2$=$C(CH_3)COO(C_2H_4O)_{4-5}PO(OH)_2$ were used as monomers. A monomeric composition of the polymer was almost the same as a composition of the charged monomers. The charged monomers are shown in Table 1.

The release persistence and the dissolution stability of the mold release agent composition were tested. The test results are shown in Table 3.

Example 10

A polymer solution (a mold release agent composition) was obtained in the same manner as in Example 1 except that 21 g of perfluoroalkyl methacrylate: $C_6F_{13}$—$CH_2CH_2OCOC(CH_3)$=$CH_2$, 8.7 g of isobornyl methacrylate, and 0.3 g of phosphate group-containing (meth)acrylic acid: $CH_2$=$C(CH_3)COOCH_2CH_2OPO(OH)_2$ were used as monomers. A monomeric composition of the polymer was almost the same as a composition of the charged monomers. The charged monomers are shown in Table 1.

The release persistence and the dissolution stability of the mold release agent composition were tested. The test results are shown in Table 3.

Example 11

A polymer solution (a mold release agent composition) was obtained in the same manner as in Example 1 except that 21 g of perfluoroalkyl methacrylate: $C_6F_{13}$—$CH_2CH_2OCOC(CH_3)$=$CH_2$, 8.4 g of isobornyl methacrylate, and 0.6 g of phosphate group-containing (meth)acrylic acid: $CH_2$=$C(CH_3)COOCH_2CH_2OPO(OH)_2$ were used as monomers. A monomeric composition of the polymer was almost the same as a composition of the charged monomers. The charged monomers are shown in Table 1.

The release persistence and the dissolution stability of the mold release agent composition were tested. The test results are shown in Table 3.

Example 12

A polymer solution (a mold release agent composition) was obtained in the same manner as in Example 1 except that 21 g of perfluoroalkyl methacrylate: $C_6F_{13}$—$CH_2CH_2OCOC(CH_3)$=$CH_2$, 7.8 g of isobornyl methacrylate, and 1.2 g of phosphate group-containing (meth)acrylic acid: $CH_2$=$C(CH_3)COOCH_2CH_2OPO(OH)_2$ were used as monomers. A monomeric composition of the polymer was almost the same as a composition of the charged monomers. The charged monomers are shown in Table 1.

The release persistence and the dissolution stability of the mold release agent composition were tested. The test results are shown in Table 3.

Example 13

A polymer solution (a mold release agent composition) was obtained in the same manner as in Example 1 except that 21 g of perfluoroalkyl methacrylate: $C_6F_{13}$—$CH_2CH_2OCOC(CH_3)$=$CH_2$, 8.4 g of stearyl acrylate, and phosphate group-containing (meth)acrylic acids: 0.4 g of $CH_2$=$C(CH_3)COOCH_2CH_2OPO(OH)_2$ and 0.2 g of $(CH_2$=$C(CH_3)COOCH_2CH_2O)_2PO(OH)$ were used as monomers. A monomeric composition of the polymer was almost the same as a composition of the charged monomers. The charged monomers are shown in Table 1.

The release persistence and the dissolution stability of the mold release agent composition were tested. The test results are shown in Table 3.

Example 14

A polymer solution (a mold release agent composition) was obtained in the same manner as in Example 1 except that 21 g of perfluoroalkyl methacrylate: $C_6F_{13}$—$CH_2CH_2OCOC(CH_3)$=$CH_2$, 7.8 g of stearyl acrylate, and phosphate group-containing (meth)acrylic acids: 0.8 g of $CH_2$=$C(CH_3)COOCH_2CH_2OPO(OH)_2$ and 0.4 g of $(CH_2$=$C(CH_3)COOCH_2CH_2O)_2PO(OH)$ were used as monomers. A monomeric composition of the polymer was almost the same as a composition of the charged monomers. The charged monomers are shown in Table 1.

The release persistence and the dissolution stability of the mold release agent composition were tested. The test results are shown in Table 3.

Example 15

A polymer solution (a mold release agent composition) was obtained in the same manner as in Example 1 except that 21 g of perfluoroalkyl methacrylate: $C_6F_{13}$—$CH_2CH_2OCOC(CH_3)$=$CH_2$, 7.76 g of stearyl acrylate, and phosphate group-containing (meth)acrylic acids: 0.8 g of $CH_2$=$C(CH_3)COOCH_2CH_2OPO(OH)_2$ and 0.4 g of $(CH_2$=$C(CH_3)COOCH_2CH_2O)_2PO(OH)$ (containing 0.04 g of phosphoric acid) were used as monomers. A monomeric composition of the polymer was almost the same as a composition of the charged monomers. The charged monomers are shown in Table 1.

The release persistence and the dissolution stability of the mold release agent composition were tested. The test results are shown in Table 3.

Example 16

A polymer solution (a mold release agent composition) was obtained in the same manner as in Example 1 except that 21 g of perfluoroalkyl methacrylate: $C_6F_{13}$—$CH_2CH_2OCOC(CH_3)$=$CH_2$, 7.76 g of stearyl acrylate, and 1.2 g of phosphate group-containing (meth)acrylic acid: $CH_2$=$C(CH_3)COOCH_2CH_2OPO(OH)_2$ (containing 0.04 g of phosphoric acid) were used as monomers. A monomeric composition of the polymer was almost the same as a composition of the charged monomers. The charged monomers are shown in Table 1.

The release persistence and the dissolution stability of the mold release agent composition were tested. The test results are shown in Table 3.

Comparative Example 1

A polymer solution (a mold release agent composition) was obtained in the same manner as in Example 1 except that 21 g of perfluoroalkyl methacrylate: $C_6F_{13}$—$CH_2CH_2OCOC(CH_3)$=$CH_2$ and 9 g of stearyl acrylate were used as monomers. A monomeric composition of the polymer was almost the same as a composition of the charged monomers. The charged monomers are shown in Table 2.

The release persistence and the dissolution stability of the mold release agent composition were tested. The test results are shown in Table 4.

Comparative Example 2

A polymer solution (a mold release agent composition) was obtained in the same manner as in Example 1 except that 21 g of perfluoroalkyl methacrylate: $C_6F_{13}$—$CH_2CH_2OCOC(CH_3)$=$CH_2$, 6 g of stearyl acrylate, and 3 g of phosphate group-containing (meth)acrylic acid: $CH_2$=$C(CH_3)COOCH_2CH_2OPO(OH)_2$ were used as monomers. A monomeric composition of the polymer was almost the same as a composition of the charged monomers. The charged monomers are shown in Table 2.

The release persistence and the dissolution stability of the mold release agent composition were tested. The test results are shown in Table 4.

Comparative Example 3

A polymer solution (a mold release agent composition) was obtained in the same manner as in Example 1 except that 21 g of perfluoroalkyl methacrylate: $C_6F_{13}$—$CH_2CH_2OCOC(CH_3)$=$CH_2$, 3 g of stearyl acrylate, and 6 g of phosphate group-containing (meth)acrylic acid: $CH_2$=$C(CH_3)COOCH_2CH_2OPO(OH)_2$ were used as monomers. A monomeric composition of the polymer was almost the same as a composition of the charged monomers. The charged monomers are shown in Table 2.

The release persistence and the dissolution stability of the mold release agent composition were tested. The test results are shown in Table 4.

Comparative Example 4

A polymer solution (a mold release agent composition) was obtained in the same manner as in Example 1 except that 21 g of perfluoroalkyl methacrylate: $C_6F_{13}$—$CH_2CH_2OCOC(CH_3)$=$CH_2$, 3 g of lauryl acrylate, and 6 g of phosphate group-containing (meth)acrylic acid: $CH_2$=$C(CH_3)COOCH_2CH_2OPO(OH)_2$ were used as monomers. A monomeric composition of the polymer was almost the same as a composition of the charged monomers. The charged monomers are shown in Table 2.

The release persistence and the dissolution stability of the mold release agent composition were tested. The test results are shown in Table 4.

Comparative Example 5

A polymer solution (a mold release agent composition) was obtained in the same manner as in Example 1 except that 28.8 g of perfluoroalkyl methacrylate: $C_6F_{13}$—$CH_2CH_2OCOC(CH_3)$=$CH_2$ and 1.2 g of stearyl acrylate were used as monomers. A monomeric composition of the polymer was almost the same as a composition of the charged monomers. The charged monomers are shown in Table 2.

The release persistence and the dissolution stability of the mold release agent composition were tested. The test results are shown in Table 4.

The meanings of the abbreviations in the tables are as follows.

13FMA: $C_6F_{13}$—$CH_2CH_2OCOC(CH_3)$=$CH_2$
STA: Stearyl acrylate
LA: Lauryl acrylate
IBM: Isobornyl methacrylate

TABLE 1

| | Example | | | | | | | | |
|---|---|---|---|---|---|---|---|---|---|
| | 1 | 2 | 3 | 4 | 5 | 6 | 7 | 8 | 9 |
| 13FMA | 21.0 | 21.0 | 27.0 | 21.0 | 21.0 | 21.0 | 21.0 | 21.0 | 21.0 |
| $CH_2=C(CH_3)COO-H_2CH_2OPO(OH)_2$ (Monoester) | 0.3 | 0.6 | 0.6 | 0.6 | 1.2 | 1.2 | | | |
| $(CH_2=C(CH_3)COO-CH_2CH_2O)_2PO(OH)$ (Diester) | | | | | | | | | |
| $CH_2=C(CH_3)COO-(C_2H_4O)_{4-5}PO(OH)_2$ (Monoester) | | | | | | | 0.3 | 0.6 | 1.2 |
| $PO(OH)_3$ (Phosphoric acid) | | | | | | | | | |
| STA | 8.7 | 8.4 | 2.4 | | 7.8 | | 8.7 | 8.4 | 7.8 |
| LA | | | | 8.4 | | 7.8 | | | |
| IBM | | | | | | | | | |

| | Example | | | | | | |
|---|---|---|---|---|---|---|---|
| | 10 | 11 | 12 | 13 | 14 | 15 | 16 |
| 13FMA | 21.0 | 21.0 | 21.0 | 21.0 | 21.0 | 21.0 | 21.0 |
| $CH_2=C(CH_3)COO-H_2CH_2OPO(OH)_2$ (Monoester) | 0.3 | 0.6 | 1.2 | 0.4 | 0.8 | 0.8 | 1.2 |
| $(CH_2=C(CH_3)COO-CH_2CH_2O)_2PO(OH)$ (Diester) | | | | 0.2 | 0.4 | 0.4 | |
| $CH_2=C(CH_3)COO-(C_2H_4O)_{4-5}PO(OH)_2$ (Monoester) | | | | | | | |
| $PO(OH)_3$ (Phosphoric acid) | | | | | | 0.04 | 0.04 |
| STA | | | | 8.4 | 7.8 | 7.76 | 7.76 |
| LA | | | | | | | |
| IBM | 8.7 | 8.4 | 7.8 | | | | |

TABLE 2

| Comparative Example | 1 | 2 | 3 | 4 | 5 |
|---|---|---|---|---|---|
| 13FMA | 21.0 | 21.0 | 21.0 | 21.0 | 28.8 |
| $CH_2=C(CH_3)COO-CH_2CH_2OPO(OH)_2$ (Monoester) | | 3.0 | 6.0 | 6.0 | 1.2 |
| $PO(OH)_3$ (Phosphoric acid) | | | | | |
| STA | 9.0 | 6.0 | 3.0 | | |
| LA | | | | 3.0 | |

TABLE 3

| Example | Release persistence (number of times) | Dissolution stability (number of days during stable) |
|---|---|---|
| 1 | 10 | 60 |
| 2 | 10 | 60 |
| 3 | 9 | 60 |
| 4 | 8 | 60 |
| 5 | 10 | 50 |
| 6 | 8 | 60 |
| 7 | 10 | 60 |
| 8 | 10 | 60 |
| 9 | 10 | 50 |
| 10 | 10 | 60 |
| 11 | 10 | 60 |
| 12 | 10 | 50 |
| 13 | 10 | 60 |
| 14 | 10 | 50 |
| 15 | 10 | 50 |
| 16 | 10 | 50 |

TABLE 4

| Comparative Example | Release persistence (number of times) | Dissolution stability (number of days during stable) |
|---|---|---|
| 1 | 3 | 60 |
| 2 | 5 | 5 |
| 3 | 0 | 1 |
| 4 | 0 | 1 |
| 5 | 6 | 20 |

INDUSTRIAL APPLICABILITY

The mold release agent composition according to the present disclosure can be used as an internal mold release agent or an external mold release agent. The mold release agent composition according to the present disclosure can be used in various types of molding.

The mold release agent composition according to the present disclosure is generally in the form of a coating material. The mold release agent composition according to the present disclosure can be used as a rust inhibitor, a desiccant, a waterproof agent, a water repellent agent, and a soil resistant agent.

The invention claimed is:

1. A fluorine-containing polymer having repeating units derived from:
   (a) a fluorine-containing monomer having a perfluoroalkyl group,
   (b) a fluorine-free monomer having a hydrocarbon group, and
   (c) a fluorine-free monomer having a phosphate group, wherein
   the fluorine-containing monomer (a) is a compound represented by formula:

$CH_2=C(-X^{11})-C(=O)-Y^{11}-Y^{12}-Rf$, wherein
   $X^{11}$ is a hydrogen atom, or a methyl group,
   $Y^{11}$ is —O— or —NH—,
   $Y^{12}$ is a direct bond, a divalent aliphatic hydrocarbon group, a divalent aromatic hydrocarbon group, or a divalent cycloaliphatic hydrocarbon group, and
   Rf is a perfluoroalkyl group having 6 to 20 carbon atoms,
   wherein the hydrocarbon group in the hydrocarbon group-containing fluorine-free monomer (b) has 1 to 40 carbon atoms,
   wherein an amount of the fluorine-containing monomer (a) is 35 to 80% by weight, based on the fluorine-containing polymer,
   wherein an amount of the hydrocarbon group-containing fluorine-free monomer (b) is 15 to 50% by weight, based on the fluorine-containing polymer,
   wherein an amount of the phosphate group-containing fluorine-free monomer (c) is 0.1 to 4% by weight, based on the fluorine-containing polymer,
   wherein the fluorine-containing polymer does not comprise a repeating unit derived from a silicon-containing monomer, and
   wherein a chain transfer agent is not used in the production of the fluorine-containing polymer.

2. The fluorine-containing polymer according to claim 1, wherein
   the hydrocarbon group-containing fluorine-free monomer (b) is a compound represented by formula:

$CH_2=C(-X^{21})-C(=O)-O-Y^{21}$ wherein
   $X^{21}$ is a hydrogen atom or a methyl group, and
   $Y^{21}$ is a hydrocarbon group having 1 to 40 carbon atoms; and
   the phosphate group-containing fluorine-free monomer (c) is a compound represented by formula:

$[CH_2=C(-X^{31})-C(=O)-O-(Y^{31})_p-(O)_q-]_nP(=O)(O-Y^{32})_{3-n}$ wherein
   $X^{31}$ is a hydrogen atom or a methyl group,
   $Y^{31}$ is an alkylene group or an oxyalkylene group having 1 to 5 carbon atoms,
   $Y^{32}$ is a hydrogen atom, an alkali metal atom, or an ammonium group,
   p is a number of 1 to 10,
   q is 0 or 1, and
   n is 1, 2, or 3.

3. The fluorine-containing polymer according to claim 2, wherein in the fluorine-containing monomer (a), $X^{11}$ is a hydrogen atom, a methyl group, or a chlorine atom, $Y^{11}$ is —O—, $Y^{12}$ is a linear or branched alkylene group having 1 to 10 carbon atoms, and the Rf group has 1 to 6 carbon atoms.

4. The fluorine-containing polymer according to claim 2, wherein in the hydrocarbon group-containing fluorine-free monomer (b), $X^{21}$ is a hydrogen atom, and $Y^{21}$ is a linear or branched monovalent aliphatic hydrocarbon group having 14 to 28 carbon atoms.

5. The fluorine-containing polymer according to claim 2, wherein in the hydrocarbon group-containing fluorine-free monomer (b), $Y^{21}$ has 16 to 26 carbon atoms.

6. The fluorine-containing polymer according to claim 2, wherein in the hydrocarbon group-containing fluorine-free monomer (b), $X^{31}$ is a methyl group, $Y^{31}$ is an alkylene group, and $Y^{32}$ is a hydrogen atom.

7. The fluorine-containing polymer according to claim 1, wherein the phosphate group-containing fluorine-free monomer (c) is a phosphoric acid monoester alone or a mixture of a phosphoric acid monoester and a phosphoric acid diester, in the mixture of a phosphoric acid monoester and a phosphoric acid diester, and a weight ratio of the phosphoric acid monoester to the phosphoric acid diester is 95:5 to 50:50.

8. The fluorine-containing polymer according to claim 1, wherein the amount of the phosphate group-containing fluorine-free monomer (c) is 0.1 to 3% by weight.

9. The fluorine-containing polymer according to claim 1, comprising another monomer (d) other than the monomers (a), (b), and (c), wherein an amount of the other monomer (d) is 0.1 to 50 parts by weight, based on 100 parts by weight of the fluorine-containing monomer (a).

10. The fluorine-containing polymer according to claim 1, consisting of repeating units derived from the monomers (a), (b) and (c).

11. A mold release agent composition comprising:
    (1) the fluorine-containing polymer according to claim 1; and
    (2) at least one liquid medium selected from water and organic solvents.

12. The mold release agent composition according to claim 11, which is a solution or an aerosol containing an organic solvent or an aqueous emulsion containing water.

13. The mold release agent composition according to claim 11, wherein an amount of the fluorine-containing polymer (1) is 0.1 to 50% by weight, based on the mold release agent composition.

14. The mold release agent composition according to claim 11, wherein an amount of free phosphoric acid present in the mold release agent composition is 1 part by weight or less, based on 100 parts by weight of the fluorine-containing polymer.

15. A mold release agent composition comprising:
    (1) the fluorine-containing polymer according to claim 1; and
    (2) at least one liquid medium selected from water and organic solvents,
    wherein an amount of free phosphoric acid present in the mold release agent composition is 1 part by weight or less, based on 100 parts by weight of the fluorine-containing polymer.

16. A method for producing the fluorine-containing polymer according to claim 1, the method comprising a step of copolymerizing:
    (a) a fluorine-containing monomer having a perfluoroalkyl group,
    (b) a fluorine-free monomer having a hydrocarbon group, and
    (c) a fluorine-free monomer having a phosphate group.

17. A method for forming a mold release agent film, the method comprising a step of:
(i) applying the mold release agent composition according to claim 11 to an inner surface of a mold to form a film of the mold release agent composition.

18. A method for producing a molded article, the method comprising steps of:
(i) applying the mold release agent composition according to claim 11 to an inner surface of a mold to form a film of the mold release agent composition,
(ii) filling the mold having the film of the mold release agent composition with a molding composition to obtain a molded article, and
(iii) removing the molded article from the mold.

* * * * *